(12) United States Patent
Lee et al.

(10) Patent No.: US 6,257,073 B1
(45) Date of Patent: Jul. 10, 2001

(54) CYCLONE TURBINE FLOWMETER AND CONTROL SYSTEM THEREFOR

(75) Inventors: Joung-Sun Lee; Jung-Eun Kim, both of Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/118,868

(22) Filed: Jul. 20, 1998

(30) Foreign Application Priority Data

Jun. 19, 1998 (KR) .................................................. 98-23108

(51) Int. Cl.[7] .............................. G01F 1/10; G01F 15/00
(52) U.S. Cl. ................................. 73/861.91; 73/861.79; 73/861.77; 73/861.92
(58) Field of Search ........................... 73/861.71, 861.72, 73/861.77, 861.79, 861.74, 861.83

(56) References Cited

U.S. PATENT DOCUMENTS

| | | | |
|---|---|---|---|
| 1,467,565 | * | 9/1923 | Blair .................................. 73/861.83 |
| 1,697,840 | * | 1/1929 | Hayes et al. ....................... 73/861.83 |
| 3,564,918 | * | 2/1971 | Ziniuk et al. ..................... 73/861.89 |
| 4,393,724 | * | 7/1983 | Werkmann et al. .............. 73/861.91 |
| 4,523,479 | * | 6/1985 | Johnson ............................. 73/861.83 |
| 4,648,281 | * | 3/1987 | Morita et al. ..................... 73/861.91 |
| 5,109,705 | * | 5/1992 | Masyagutov et al. ............ 73/861.92 |
| 5,636,178 | * | 6/1997 | Ritter ................................. 73/861.79 |

* cited by examiner

*Primary Examiner*—Harshad Patel
(74) *Attorney, Agent, or Firm*—Jones Volentine, L.L.C.

(57) ABSTRACT

The present invention relates to a cyclone turbine flowmeter for extracting information about a flow rate or measuring the quantity of flow flowing in production facilities. The cyclone turbine flowmeter includes a cyclone turbine formed with flow channels for allowing liquids flowing in from the outside to receive rotary power, a rotor rotated by the liquids passed through the flow channels of the cyclone turbine, a turbine bearing manufactured so as to minimize frictional forces and at the same time, to have durability and resistance to chemicals, and a vibration isolation bearing constructed in such a manner of enclosing the turbine bearing and its turbine axle to prevent vibration.

14 Claims, 8 Drawing Sheets

CYCLONE TURBINE FLOWMETER AND CONTROL SYSTEM THEREFOR

BACKGROUND OF THE INVENTION

1. Field of the Invention

The present invention relates to a cyclone turbine flowmeter for enabling to obtain a signal of flow rate by using energy of fluids, and more particularly to a cyclone turbine flowmeter and a control system therefor for extracting information about a flow rate or measuring the quantity of flow flowing in production facilities and by which signals output as a result of flow measurement are detected and monitored, thereby enabling an user to effectively perform manufacturing process controls.

2. Description of the Prior Art

Generally, a flowmeter has been used and held a key element in measuring continuously a flow rate of liquid in order to apply the results to a manufacturing process control while fluids of high purity (water, gas, oil, chemicals and medicines in a high pure state) are continuously supplied during manufacturing processes, in the various fields of industry, that is, in the fields of industry relating to semiconductor, electrical and electronics parts, aviation and space engineering, refining for oil, chemical engineering and the like.

There are many kinds of flowmeters which are used in the industrial world, and are mainly classified by functions and measuring principles of industrial flowmeters, and by whether or not energy generated by flowing fluids themselves is used.

At this location, for example, the flowmeters produced on a commercial scale may be classified into volume, area, pressure, turbine and turbulent streamline control flowmeters according to whether or not energy generated by fluid itself is used to get a signal of the quantity of flow, and the flowmeters which energy sources are separately needed are classified into ultrasonics, electronics and mass flowmeters.

Flowmeters are classified according to various kinds of measured fluids as follows.

TABLE 1

| Measured fluids | Classification of flowmeters |
| --- | --- |
| For liquid or gas | volume flowmeter, area flowmeter, differential pressure flowmeter, turbine flowmeter, vortex flowmeter, ultrasonic flowmeter, mass flowmeter (Coriolis type, thermal type, vortex-type), integrating calorimeter |
| For liquid only | electronics flowmeter, open channel flowmeter |

Among the above-mentioned flowmeters, the turbine-type of flowmeter is widely used. Such turbine type of flowmeter is controlled in such a manner that energy of flowing liquid is transmitted to a fan (blade) mounted to a rotor.

However, such conventional turbine type of flowmeters have the following problems caused by the fact that liquids flowing through the flowmeter stream directly into manufacturing equipments.

First, the conventional flowmeters generally lack in impacts from the outside. That is, the quantity of flow to be measured by the flowmeters is abruptly changed by outside impacts of the flowmeter bodies or by pressure change in liquids flowing within the flowmeters, and such sudden change in the amount of flowing liquids often causes to be broken in the flowmeters.

Second, the conventional flowmeters cause to enormously raise rotor's noises and measurement errors in response to a direction of installation thereof. That is, when the flowmeters are not installed in the direction designed by manufacturers, liquids flowing through the flowmeters are interfered in its flow directions because the flowmeters are simply constructed by a rotor and small sized tubes which supply liquids to the rotor, thereby causing measurement errors and raising frictional forces.

Third, the conventional flowmeters used to result in the deterioration in temperature characteristic of liquids to be measured. That is, the rotor of the flowmeters, bodies fixed to them, bearings, and the like are made of various materials, for example, metals, non-metals, teflon-type of compounds and the others, and have coefficients of thermal expansion different from each other. Thus, there is problems according to the conventional flowmeters, when temperature in environments is changed, in that rotary power of the rotors are remarkably reduced due to the repeated thermal expansion and thermal contraction, furthermore, bodies of rotational rotors themselves become separated from one another, after all.

FIG. 1 shows an operating state view applied to a ball type of a flowmeter as a detailed embodiment in the prior art. As shown in FIG. 1, liquids (medical supplies) which have been stored within a tank 20 pass through a flowmeter 21, and are filtered by a filter 22 while the liquids pass through it. Thereafter, the liquids are stored in a measuring tank 23, the stored liquids are not supplied to a circulation system of medical supplies until a predetermined amount of liquids has been reached while the liquids are stored.

Such a conventional simple system in which the ball-type of a flowmeter is installed is widely used more than 90%, a record-control type of a flowmeter is rarely used because it has various problems in a degree of precision and re-availability. Furthermore, there is a problem, in case any accident in the process happens, in that the measuring tank is necessarily needed in controlling the ratio of compounds or the amount of pure water supply in order to analyze the reason why the accident happens.

SUMMARY OF THE INVENTION

Accordingly, the present invention is provided to solve the aforementioned problem and it is an object of the present invention to provide a cyclone turbine flowmeter which deterioration of its rotational rotor resulting from pressure change in liquids to be measured is minimized and exterior impacts can be fully overcome.

Another object of the present invention is to provide a control system of a cyclone turbine flowmeter in which degree of measurement sensitivity is still maintained as a good state while energy generated in response to liquid's flowing operation is transmitted to energy such as frictional forces or noises, and at the same time, by which can precisely measure the amount of liquids by improving temperature change characteristic according to a coefficient of thermal expansion to suppress a loss in energy transmitting mechanism of liquids which appears while liquids flow within the flowmeter.

In accordance with the objects of the present invention, there is provided a cyclone turbine flowmeter having a cap and a housing, the flowmeter comprises a cyclone turbine formed with a flow path which enables flowing liquids to receive rotary power when flowing therein, a rotor rotated by the liquids passed through the flow path of the cyclone turbine, a turbine bearing manufactured so as to minimize frictional forces and at the same time, to have durability and resistance to chemicals, and a vibration isolation bearing constructed in such a manner of enclosing the turbine bearing and turbine axle to prevent vibration.

The cyclone turbine is formed with a plurality of flow channels (flow paths) inclined in an angle of predetermined degree so that liquids can pass therethrough by strong rotary power. The rotational rotor is formed on blades thereof with a plurality of grooves inclined in an angle of predetermined degree so that the rotor enables to smoothly rotate by high pressure of fluids passed through the flow paths (flow channels) of the cyclone turbine. The axle of the rotational rotor is designed so as to have the number of rotations less than that of the rotational rotor. The rotational rotor is fixedly inserted at the body thereof with a required number of magnets, or formed at a periphery of the body with a predetermined number of grooves, to detect the number of rotation.

Also, according to another embodiment of the present invention, the grooves formed on the body of the rotor is provided in the front thereof with a photo device to transmit or receive light. The size of the grooves which is flow channels of the rotor and cyclone turbine can be varied in response to the amount of flowing liquids (flow rate) which is supplied according to the work process.

In accordance with the objects of the present invention, a control system of the flowmeter comprises a sensor for detecting a variation in the intensity of the magnetic field generated by magnets fixedly-inserted to the body of the rotor in response to the rotation of the rotor, a signal input unit for converting the detected signal to a suitable signal to determine flow rate, a microprocessor for receiving a signal from the signal input unit and operating a present flow rate, a signal output unit for converting the flow rate data operated by the microprocessor to a suitable signal, and an electric power source for supplying electric power to drive the microprocessor and sensor.

The sensor can be replaced by the photo device which allows to transmit and receive light therethrough. The photo device can be made by various type of elements, for example, light receiving elements-combined luminous elements, optic fiber, a line-system which allows to receive or transmit light, and the like.

The microprocessor allows to input and store in advance an optimum flow rate data to be supplied in response to the work process, and a control program for controlling flow rate in case of being over the optimum flow rate. The signal input unit may be an analog to digital convertor, and the signal output unit may be a digital to analog convertor.

In addition, in accordance with the objects of the present invention, a control system of a flowmeter comprises a sensor for detecting a variation in the intensity of the magnetic field generated by magnets fixed to a body of a rotor in response to rotation of the rotor, a signal input unit for converting the detected signal to a suitable signal to receive the detected signal by the sensor and determine flow rate, a signal output unit for converting the flow rate data operated by the microprocessor to a suitable signal, an electric power source for supplying electric power to drive the microprocessor and sensor, a display unit for displaying a present flow rate determined by the microprocessor, an integrating unit for integrating flow rate during a predetermined time, a flow rate determining unit for determining a flow rate to be supplied in response to the present flow rate determined by the microprocessor, and an alarm for informing the excessing flow rate in case of being over the optimum flow rate to be supplied during the work process.

According to the flowmeter of the present invention thus constructed, the cyclone turbine is designed to absorb thermal impact, pressure impact, and noise-type of energy resulting from the abrupt variation of the flow rate (noises generated when liquid pressure is suddenly dropped), and flow measurement can be precisely performed without a loss of energy while pressure balance is maintained because the rotor rotates by liquids guided into the flow path of the cyclone turbine.

Furthermore, the vibration preventing bearing serves to lengthen the expected life span of the flowmeter and to raise wear resistance. And, the friction resistance can be reduced and the efficiency of the liquid flow can be raised because the cyclone turbine and rotor are formed on its blade parts with a plurality of flow paths and grooves spaced from each other.

BRIEF DESCRIPTION OF THE DRAWINGS

For fuller understanding of the nature and object of the invention, reference should be made to the following detailed description taken in conjunction with the accompanying drawings in which:

FIG. 2 is a mechanical configuration view for illustrating a cyclone turbine flowmeter according to an embodiment of the present invention:

FIG. 3 is a mechanical configuration view for illustrating main elements of the cyclone turbine flowmeter according to an embodiment of the present invention:

DETAILED DESCRIPTION OF THE PREFERRED EMBODIMENT

Figure 1:
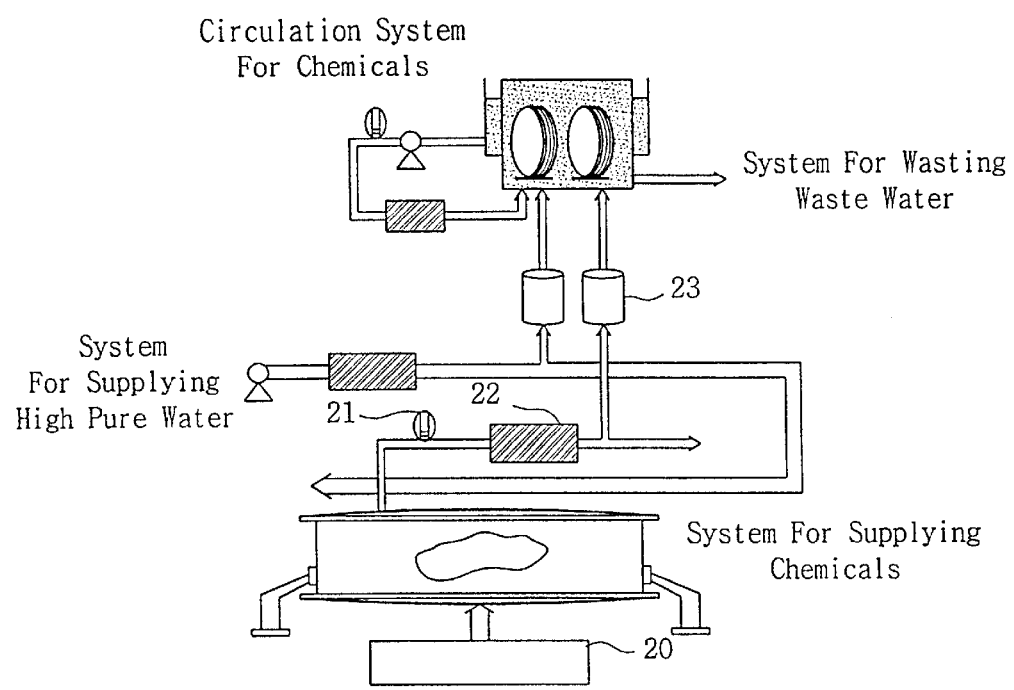
FIG. 1 is a flow chart for showing an applied state of a flow rate supply apparatus according to the prior art.

The preferred embodiment of the present invention will now be described in detail with reference to the accompanying drawings.

Throughout the drawings, like reference numerals and nomenclature are used for designation of like or equivalent parts or portion for simplicity of illustration and explanation, a detailed description of which will be omitted.

Figure 2A:
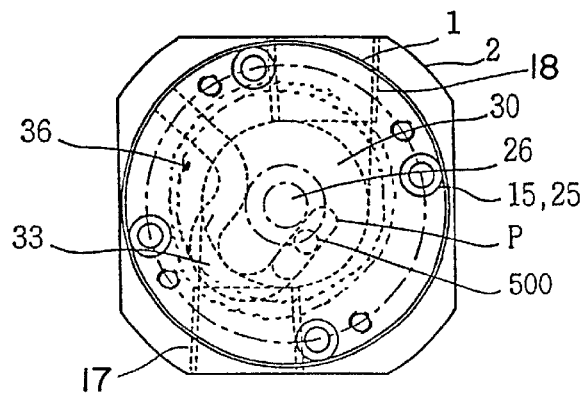
FIG. 2A is a sectional view for illustrating a flowmeter according to the present invention.
Figure 2B:
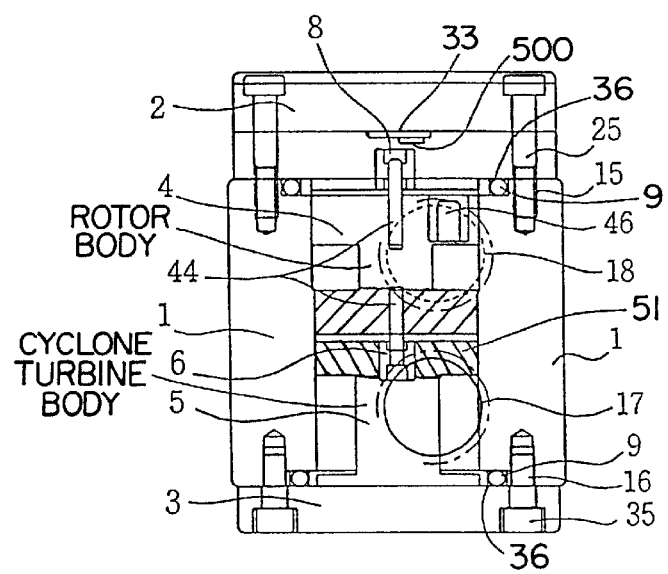
FIG. 2B is a perspective view for showing the inside of the flowmeter according to the present invention.
Figure 2C:
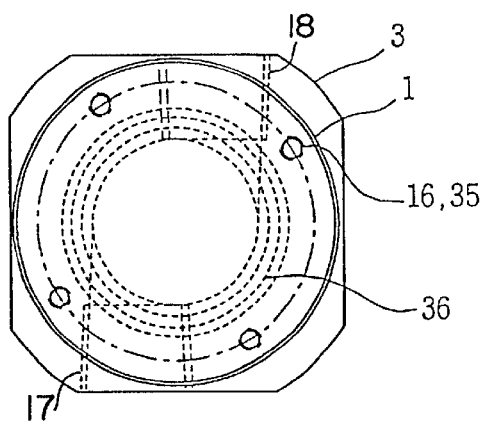
FIG. 2C is a sectional view for showing the bottom of the flowmeter according to the present invention.

FIG. 2 is a mechanical configuration view for showing a cyclone turbine flowmeter according to an embodiment of the present invention, FIG. 2A is a sectional view for illustrating a flowmeter according to the present invention, FIG. 2B is a perspective view for showing the inside of the flowmeter, and FIG. 2C is a bottom plan view for showing the bottom of the flowmeter according to the present invention.

Figure 3A:
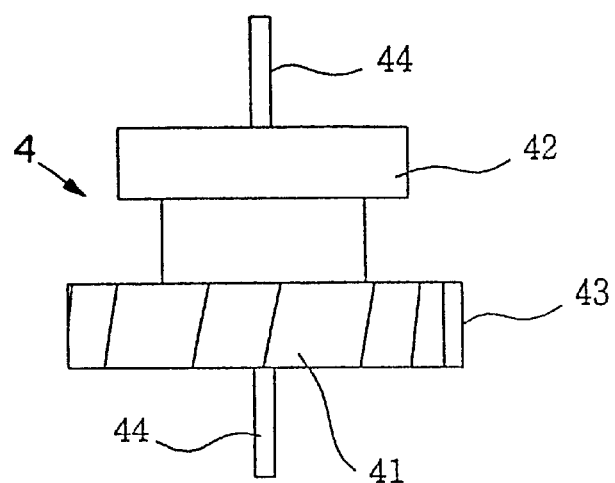
FIG. 3A is a side plan view for showing a rotor of the flowmeter according to the present invention.
Figure 3B:
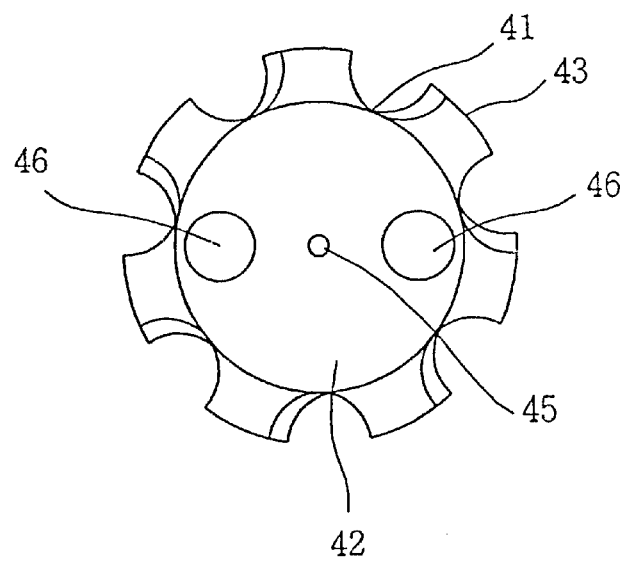
FIG. 3B is a plan view of the rotor.
Figure 3C:
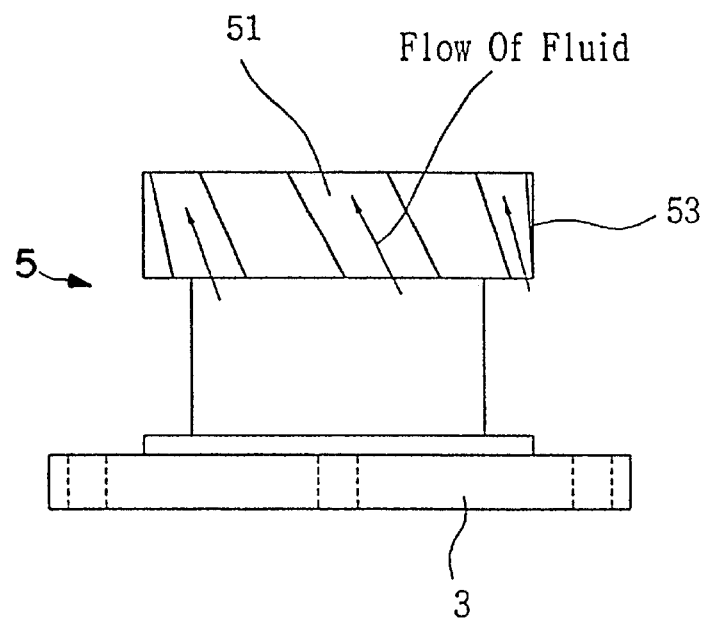
FIG. 3C is a side plan view for showing a fixed turbine.
Figure 3D:
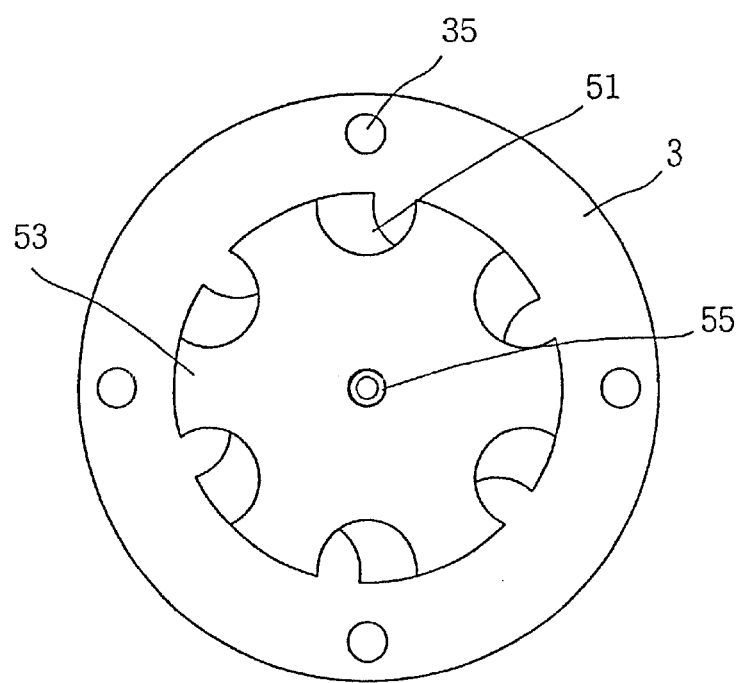
FIG. 3D is a plan view for illustrating the fixed turbine.

FIG. 3 is a mechanical configuration view for illustrating main elements of the cyclone turbine flowmeter according to an embodiment of the present invention, FIG. 3A is a side plan view for showing a rotor of the flowmeter, FIG. 3B is a plan view of the rotor, FIG. 3C is a side plan view for showing a fixed turbine, and FIG. 3D is a plan view for illustrating the fixed turbine.

Figure 4:
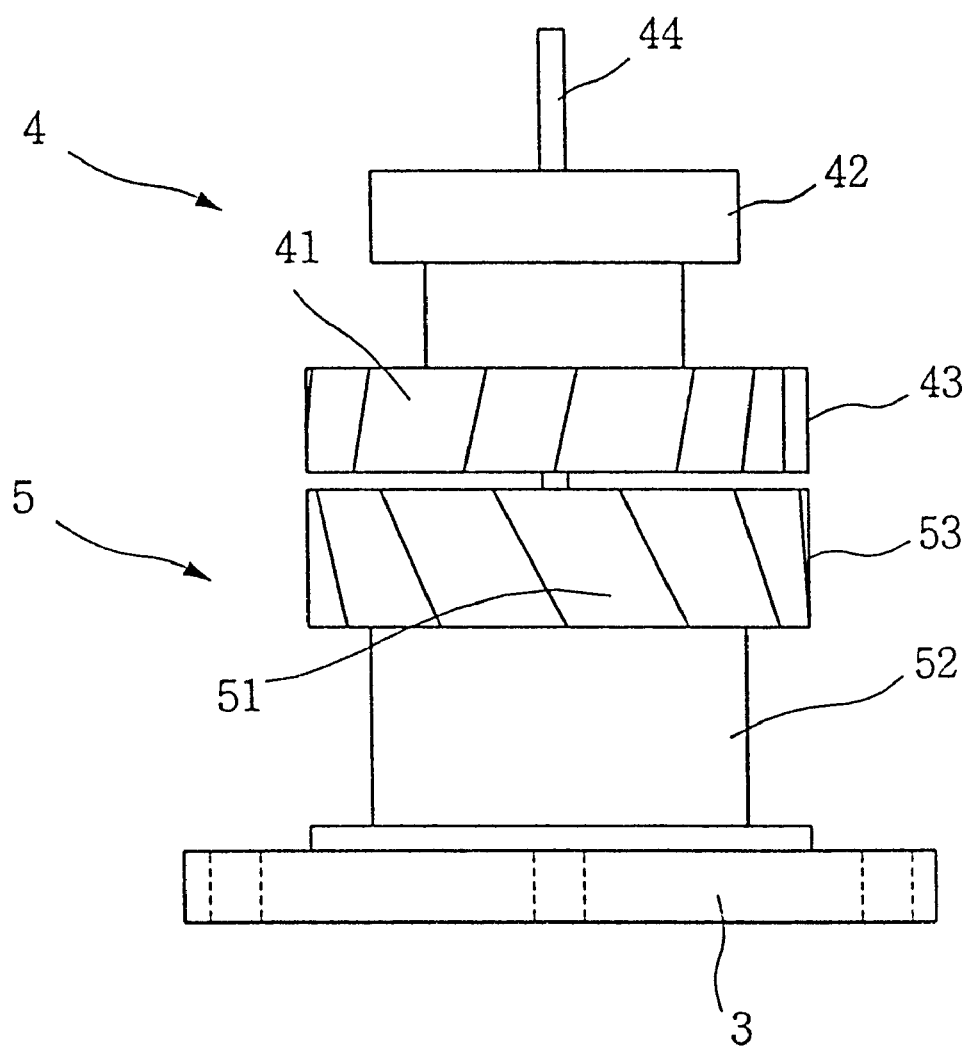
FIG. 4 is an assembled state view for showing a cyclone turbine connected to the rotor of the flowmeter according to the present invention.

FIG. 4 is an assembled state view for showing a cyclone turbine connected to the rotor of the flowmeter according to the present invention.

The flowmeter according to the present invention falls under a turbine type of a volume flowmeter as classified by measurement methods.

The flowmeter according to the present invention has a special structure which allows an adapted material of the flowmeter to be easily changed in response to the kind of liquids used, thereby serving to precisely measure flow rate.

The flowmeter according to the present invention, as shown in FIG. 2, comprises a housing 1, an upper and lower caps 2 and 3, a rotor 4, a cyclone turbine 5, a vibration preventing bearing 6, magnets 46 and a turbine bearing 8.

The upper and lower caps 2 and 3, as shown in FIGS. 2A and 2C, is formed at a predetermined positions, with holes 25 and 35 for inserting bolts thereinto. It is desirable that four bolts are fitted to the corresponding four holes, respectively.

The four holes 25 and 35 play a role of connecting the upper and lower caps 2 and 3 to a housing 1 to prevent the inner side of the flowmeter from receiving exterior pressure and impact, and are inserted with the four bolts to assemble the housing and caps.

At this time, the diameters of the holes 25 and 35 formed at the upper and lower caps 2 and 3 can be conveniently determined by a manufacturer, and is generally determined in such a manner that the upper and lower caps 2 and 3 are tightly assembled to the housing of the flowmeter to minimize the exterior impacts.

The bolts for fixing the housing 1 of the flowmeter and the caps 2 and 3 are inserted into the holes 25 and 35 formed at the caps 2 and 3, and are secured at a predetermined depth of the corresponding grooves 15 and 16 for fixing screw bolts. Accordingly, the flowmeter performs precisely its operation and functions because the housing 1 and the upper and lower caps 2 and 3 serve to shield the inner side of the flowmeter from outside thereof.

Meanwhile, it is desirable that a predetermined zone 30 of the upper cap 2 is formed with a transparent or semitransparent materials to monitor a state of rotor revolution therethrough. It is preferred that the zone 30 formed with the semitransparent or transparent materials is disposed in the near zone of an extension line of the rotor axle to enable to see the rotation state of the rotor.

Furthermore, the upper cap 2, as shown in FIG. 2A, is formed with the groove 33 for inserting a hall sensor and electric wire to detect a magnetic field which is varied in response to the revolution of the rotor. It is desirable that the hall sensor 500 is provided on the position P to precisely detect a magnetic field generated by magnets fixed at the rotor. The hall sensor 500 is connected to a signal input unit through an electric wire. In this case, it is easy to detect a magnetic field because the hall sensor 500 is positioned over the magnet of the rotor.

Also, the upper cap 2 is formed at the center inside thereof with a rotation axis-inserted groove 26 having a predetermined depth so that the rotation axle of the rotor is inserted therein.

The housing 1 according to the present invention plays a role of the body of the flowmeter and allows the flowmeter to be smoothly operated. The housing 1 is formed with the grooves 15 and 16 for inserting the corresponding bolts at positions corresponding to holes 25 and 35 formed on the upper and lower caps 2 and 3.

In addition, the housing 1 is formed with a groove 36 having a predetermined diameter for allowing an O-ring 9 to be inserted therein lest flowing liquids be leaked by pressure generated when liquids are stored in the inner side of the flowmeter.

The cyclone turbine 5 according to the present invention, as shown in FIGS. 2B, 3C, 3D and 4, is provided with a body 52 fixed to about the center position of the lower cap 3, and is formed on the blades 53 with a plurality of flow paths 51 inclined at a predetermined degree so that liquids flowing through a liquid inlet 17 flow therethrough, and on to a liquid outlet 18.

Accordingly, the flowmeter according to the present invention enables to reduce a friction resistance resulting from a flow action of the liquids when liquids flowing through the inlet 17 pass through the plurality of flow paths 51 and on to the outlet 18, and at the same time, to easily rotate the rotor because it receives a rotary power generated due to the inclination of the flow paths even if flow rate becomes lowered.

The cyclone turbine 5 has a groove 55 formed in the center of the blade body 53 for allowing a rotary axle to be inserted therein. According to the present invention, the cyclone turbine 5 is designed to exert evenly a torque on the whole of the rotor 4 and accordingly, live and static loads are lower than those of the conventional flowmeter. Also, the flowmeter of the present invention can cover a wide range of flow rates because the cyclone turbine and rotor can be easily changed to those having different sizes in response to the range of the flow rate, and be used even in the temperature range of –40 to 135 in case of using reliable parts which can resist the temperature change.

Furthermore, the size of the flow path (flow channel) 51 formed on the blade 53 of the cyclone turbine 5 can be changed in response to a flow rate to be supplied to the work process.

The rotor 4, as shown in FIGS. 2B, 3A and 3B, is provided on the periphery of the blades 43 thereof with the grooves 41 as the so-called flow paths (flow channels). The grooves 41 is inclined at a predetermined degree relative to the rotor axle. Accordingly, the plurality of the inclined grooves 41 cause to exert a torque on the rotor 4 when fluids supplied from the cyclone turbine 5 flow therethrough, thereby allowing to reduce a friction resistance resulting from the liquid flow and improve the rotary power of the rotor 4.

Furthermore, it is desirable that the size in the diameter of the groove 45 for inserting a rotation axle 44 be designed to become longer than that of the rotation axle 44 so that the rotation axle 44 can slightly slip within the groove 45, thereby preventing the rotation axle 44 from being worn away.

The body 42 of the rotor 4 is provided at a predetermined interval with a predetermined number of magnets, for example, two magnets 46. The magnetic field generated by the magnets 46 is detected by the hall sensor 500 to determine the flow rate in the flowmeter based on the number of rotation of the rotor 4 per unit time.

According to the configuration thus constructed, when the rotor 4 provided with the magnets 46 rotates, the intensity of the magnetic field is varied in response to the number of rotation of the rotor 4 per unit time, and also the varying intensity of the magnetic field is detected by the hall sensor 500 and the flow rate is accordingly determined by a microprocessor receiving the detected data.

Figure 5A:
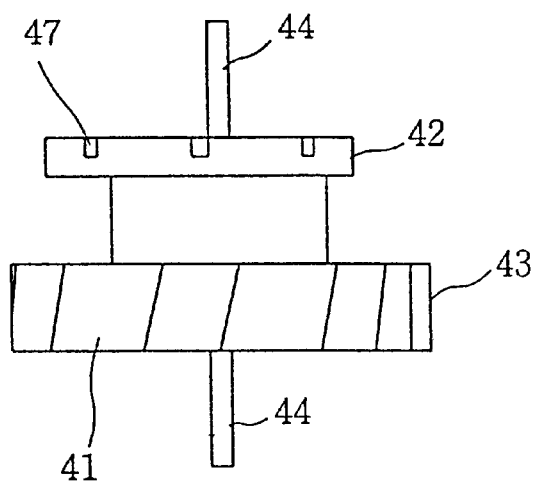
FIGS. 5A and 5B are front and plan views according for showing the rotor according to the present invention.
Figure 5B:
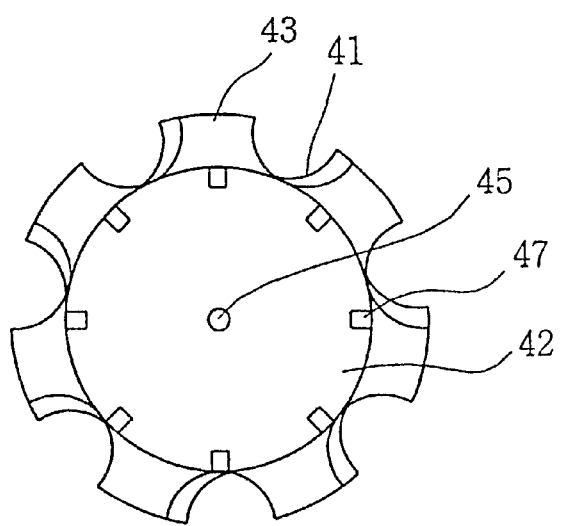

Meanwhile, according to another embodiment for a flow measurement, as shown in FIG. 5, the body 42 of the rotor 4 may be formed at a predetermined interval with a plurality of grooves 47. In this case, the thickness of the body 42 may be reduced by the thickness of the magnet 46.

As shown in FIG. 5A, the body 42 formed with the plurality of the grooves 47 are disposed parallel with the blades 43 formed with the plurality of the inclined grooves 41. Thus, when a photo device is disposed in the front of the body 42 and transmits a light toward the body 42, the light passes through the grooves 47 only and accordingly appears as a pulse when the rotor 4 rotates. In addition, in case a photo device which is designed to transmit and again receive a light through a one line is disposed in the near position of the grooves 47, when the photo device emits lights toward the body 42, the lights are again reflected from the grooves and the others not formed with the grooves, respectively. Because the intensity of the reflected lights are different, the number of rotation of the rotor 4 can be determined based on the different respective intensity of the lights.

That is, a microprocessor enables to detect the rotation state of the rotor based on the changes in the intensity of the detected magnetic field and the received light and to determine a flow rate accordingly. Meanwhile, the number of the grooves 47 formed at the body 42 of the rotor 4 may be varied by a manufacturer, but it is preferred that the grooves be formed as many as possible in its number. The reason is that, even if flow rate in the cyclone turbine 5 is lowered and the number of rotation of the rotor 4 becomes decreased accordingly, the many number of the grooves make possible to detect precisely the changes in the intensity of the lights and the magnetic field to thereby determine the flow rate.

As shown in FIG. 4, the rotor 4 and the cyclone turbine 5 are coupled by the rotation axle 44 being inserted to the groove 55. The other end of the rotation axle 44 is inserted into the inserting groove 26 formed in the upper cap 2.

At this location, because the blade 43 of the rotor 4 is disposed facing the blade 53 of the cyclone turbine 5 and liquids passed through the flow channels 51 pass through the inclined grooves 41 of the rotor 4, the rotor 4 can easily rotate by a torque generated by the inclined flow channels even if the quantity of flow is very small.

The size of the flow channels 41 of the blade 43 may be changed in response to the quantity of flow to be supplied to the work process.

The flowmeter according to the present invention is designed to enable all parts to be operated by non-contacted type and non-friction type except the turbine bearing. In other words, all parts are designed to slip each other. That is, as shown in FIG. 2B, in order to preventing vibration even in a high flow rate, the parts contacted to the rotation axle 44 of the rotor 4 are mounted with the turbine bearing 8 made of crystal and the vibration preventing bearing 6, respectively. Accordingly, the flowmeter of the present invention can maintain a semi-permanent life as a result of using something special such as vibration preventing bearing 6 and turbine bearing 8.

As is described above, the flowmeter according to the present invention has main elements such as the rotor 4 and cyclone turbine 5 having the inclined flow passages (flow channels) causing torque. Accordingly, noises such as thermal impact, pressure impact and arrupt changes in flow rate can be absorbed by the cyclone turbine 5 thus designed, and liquids are guided by the flow channels 51 of the cyclone turbine 5, so that the rotor 4 easily can rotate to thereby measure precisely flow rate without a loss in energy.

Figure 6:
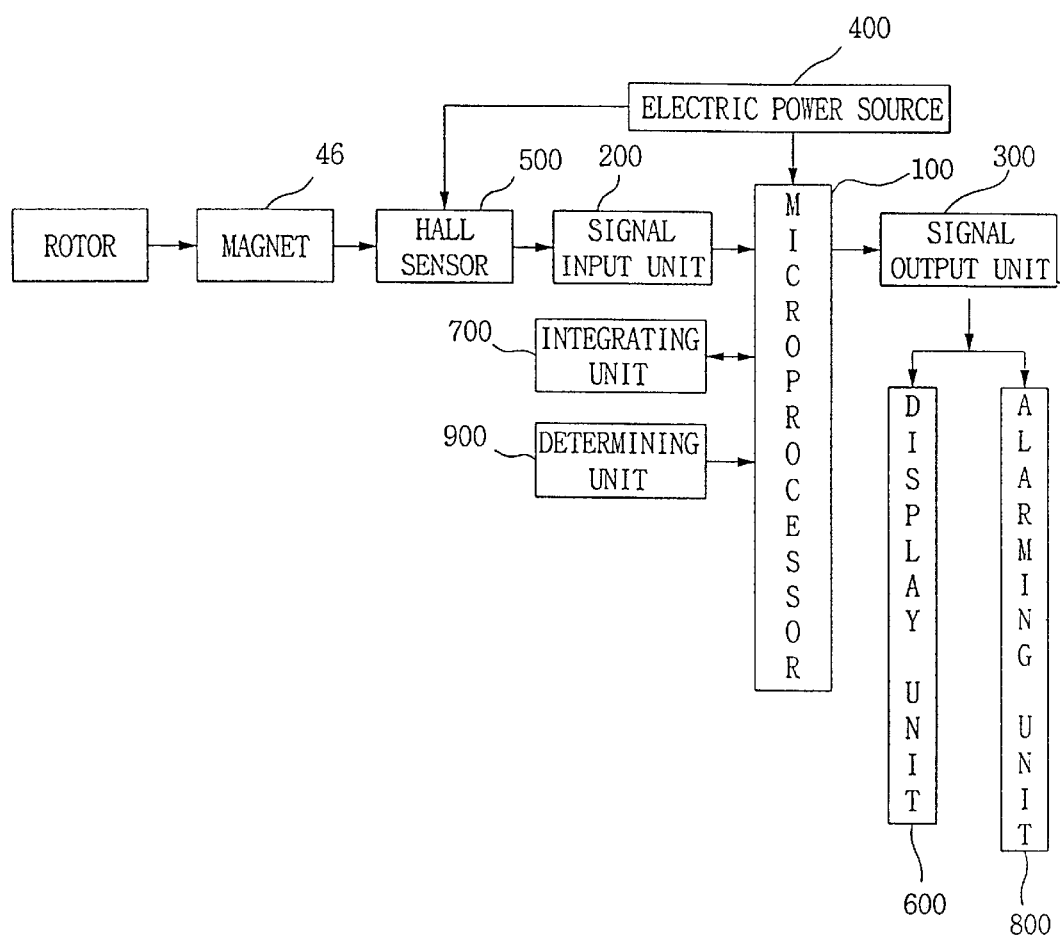
FIG. 6 is a block diagram for showing a control system of the flowmeter according to the present invention.

As shown in FIG. 6, the control system of the flowmeter according to the present invention comprises a microprocessor 100, a signal input unit 200, a signal output unit 300, an electric power source 400 and a sensor 500.

The signal input unit 200 receives a signal which the hall sensor 500 detected a change in the intensity of magnetic field per unit time generated by magnets 46 fixed at the body 42 of the rotor 4 when the rotor rotates by liquids passing through the flow channels 51 of the cyclone turbine 5, and the signal input unit 200 converts the detected signal to a suitable signal so that it can be operated by the microprocessor 100. For example, the signal input unit 200 plays a role of an analog to digital converter which converts an analog signal detected by the hall sensor 500 to a digital signal to enable the microprocessor to operate the signal. The analog signal is varied in response to a change in the intensity of magnetic field generated by rotation of the rotor.

Meanwhile, as is described in the above, in case the body periphery of the rotor 4 is formed with a plurality of the grooves 47, the light transmitted from the photo device passes through the grooves 47, but is intercepted at the other parts, that is, in the zone which is not formed with the grooves 47, so that only data concerning the intensity of radiation passed-through the grooves is input to the microprocessor 100 to determine the state of the rotation of the rotor 4. It is also possible that the light transmitted from the photo device does not pass through the grooves 47 but can be reflected so that the rotation state of the rotor 4 is determined based on the intensity of the reflected light.

The microprocessor 100 receives a signal from the hall sensor or the photo sensor and serves to operate the quantity of flow, where the data processed by the microprocessor 100 is used as an important basis in controlling the whole actuation of the flowmeter.

The microprocessor 100 has a memory apparatus in which data concerning the quantity of flow (flow rate) per unit time has already been stored, where the determined data can be varied in response to a work process.

In addition, a control program is stored in the microprocessor 100 to determine whether the optimum quantity of flow is supplied in response to a work process, by which a non-optimum quantity of flow can be changed to an optimum quantity of flow.

Meanwhile, the predetermined time (unit time) is counted by a timer mounted in the microprocessor 100.

The signal output unit 300 converts the flow-rate data, which was operated and processed in the microprocessor 100 based on the detected signal input from the hall sensor 500 or photo device, to a suitable signal by control of the microprocessor 100 for indicating, integrating, determining and alarming.

The signal output unit 300 plays a role of a digital to analog converter which converts a digital signal, which is output from the microprocessor 100, to an analog signal to indicate, integrate and alarm data processed by the microprocessor 100.

The electric power source 300 serves to supply electric power to the microprocessor 100 and hall sensor 500 to actuate the system.

The display unit 600 displays the flow rate which is determined by the microprocessor 100 based on the intensity of radiation which is received by the photo device, or the intensity of magnetic field which is detected by the hall sensor 500, which may be constructed by using the prior art including a Light Emitting Diode.

In addition, the display unit 600 can be constructed so as to display the quantity of flow (flow rate) continuously, or at a predetermined time intervals. Such configuration enables a worker to see the state of flow rate at any time and cope with the situation. At this case, the display unit 600 can display the flow rate as a numeral or a letter through a plurality of light emitting diodes according to a control actuation of the microprocessor 100.

The integrating unit 700 integrates the quantity of flow per a predetermined time which is determined by the microprocessor 100. That is, in case the quantity of flow is increased due to outside interference or internal interference of the flowmeter, only a predetermined quantity of liquid flow allows to be supplied, and the other quantity of flow rate is integrated to be seen by a worker. This function can be performed continuously, or at a predetermined time intervals.

At this time, the integrated flow rate can be used as a data for controlling the quantity of flow which flows in from the outside.

That is, in case the quantity of inflow is increased, only the predetermined quantity of flow is supplied, the other quantity of flow is used as a data for determining an optimum quantity of flow and reducing the excess quantity of flow, thereby allowing the optimum quantity of flow to be always supplied to the system. Such control actuation is formed by the microprocessor 100.

The alarming unit 800 performs an alarming function to a worker through the microprocessor 100 when the quantity of flow goes beyond the optimum quantity of flow and when a work process is finished.

Such alarming function can also be performed by using both of the vision type device and audio type device. For example, the vision type device may be a light emitting diode by which a red colored lamp is constructed to emit lights periodically, and the audio type device may be a buzzer which alarms periodically.

The determining unit 900 determines the optimum quantity of flow to be supplied in response to a work process so that the microprocessor 100 enables to store data resulting from the determination.

Now, the operation of the control system thus constructed will be described with reference to FIGS. 2 to 6.

When liquids flows in through the inlet 17 and reaches a predetermined quantity of flow, the liquids starts to pass through the flow channels 51 of the cyclone turbine 5, where the flow channels 51 are formed inclined at a predetermined angle so that the liquids receive a rotary power according to a degree of inclination.

The liquids passed through the cyclone turbine 5 exerts a torque (rotary power) on the flow channels 45 of the rotor 4, when the liquids accelerated while passing through the cyclone turbine 5 enable the rotor 4 to rotate by the pressure generated when the liquids contact to the grooves 45.

When the rotor 4 rotates, the change in the intensity of magnetic field generated by the magnets 46 is detected by the hall sensor 500. Accordingly, the detected signal is converted to a digital signal through the signal input unit 200 and input to the microprocessor 100, and the microprocessor 100 determines the changes in the intensity of the magnetic field per unit time counted by a timer according to the program stored, thereby determining the quantity of flow being supplied based on the determination.

The present flow rate determined by the microprocessor 100, which is indicated as a digital signal, is output to the signal output unit 300 and converted to an analog signal, thereby enabling a user to see the flow rate through the display unit 600.

Meanwhile, the microprocessor 100 performs the control actuation in response to whether the flow rate determined by the microprocessor 100 is an optimum quantity of flow to be supplied.

That is, when the quantity of flow determined by the microprocessor 100 goes beyond the optimum quantity of flow, the display unit 600 displays the corresponding data, the determining unit 900 newly determines the quantity of flow to be supplied for converting the exceeded quantity of flow to an optimum quantity of flow to store the newly determined data in the microprocessor 100.

Accordingly, the liquids flows in the flow channels of the cyclone turbine 5 through the inlet 17 in accordance with the newly determined data, the rotor 4 accordingly rotates, the microprocessor 100 again determines the quantity of flow being newly supplied to determine whether the newly determined data meets the change in the intensity of magnetic field according to the rotation of the rotor 4, and the display unit 600 displays the determined data That is, such newly supplied flow rate (quantity of flow) is used as a basis of the determination of an optimum flow rate Meanwhile, the alarming unit 800 alarms by control of the microprocessor 100 when the quantity of flow to be supplied goes beyonds the optimum flow rate and when a work process is finished, thereby enabling a user to control effectively the flowmeter.

Figure 7:
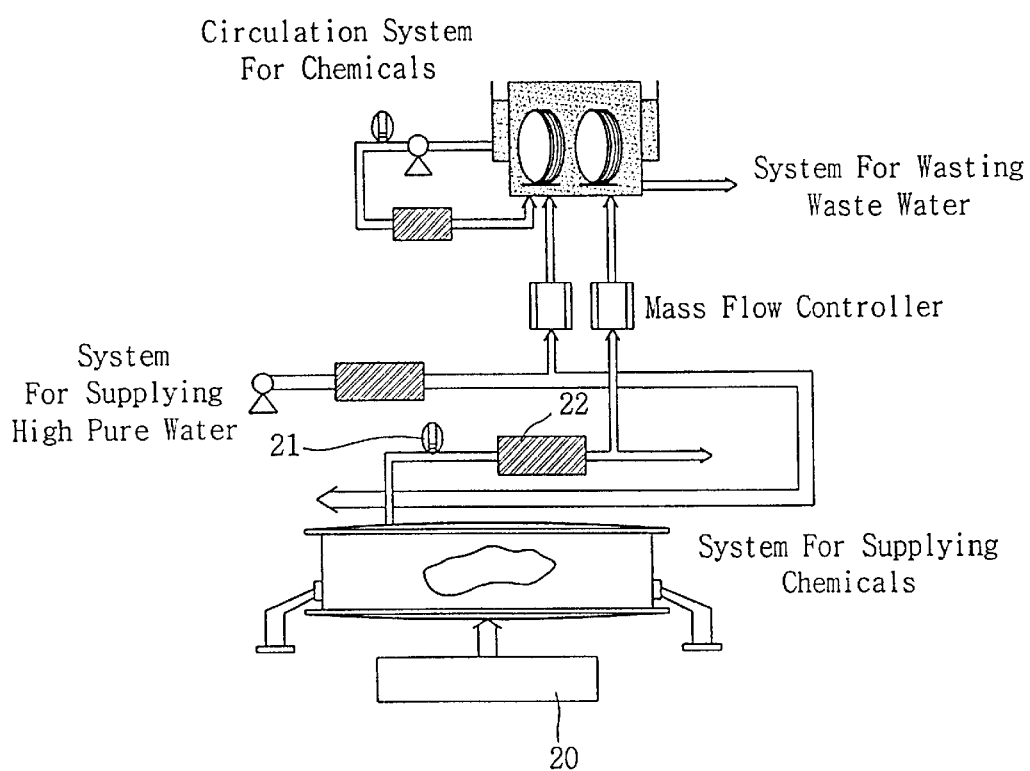
FIG. 7 is a flow chart for showing an applied state of the flowmeter according to the present invention.

As shown in FIG. 7, when the flowmeter according to the present invention is applied to the practical system, the storage tank used in the prior art is not needed to be used to the system, the microprocessor, instead, performs control for supplying an optimum flow rate to be supplied in response to a work process.

As is apparent from the foregoing, there is an advantage in the cyclone turbine flowmeter of the present invention in that thermal impact, pressure impact and noises resulting from an abrupt change in flow rate are absorbed by the cyclone turbine, and flow rate can be precisely measured without a loss in flow rate energy while maintaining pressure balance by a way that liquids are guided into the flow channels to thereby rotate the rotor.

In addition, vibration isolation bearing and turbine bearing is designed to allow the flowmeter of the present invention to maintain a semi-permanent life span and wear resistance.

It will be apparent to those skilled in the art that various modifications and variances can be made in the structure of the cyclone turbine flowmeter of the present invention without departing from the spirit or scope of the invention. Thus, it is intended that the present invention cover the modifications and variances of this invention provides they come within the scope of the appended claims and their equivalents.

What is claimed is:

1. A cyclone turbine flow meter having upper and lower caps, and a housing, the flowmeter comprising:

an inlet formed on a sidewall of the housing for allowing liquids to flow into the housing;

a cyclone turbine formed with flow channels for allowing liquids flowing in through the inlet to receive rotary power, the cyclone turbine including a turbine body connected to the flow channels for defining a first space between the cyclone turbine body and the side wall of the housing, wherein the inlet is formed near the turbine body;

a rotor having a plurality of flow path grooves and a rotor body connected to the flow path grooves for defining a second space between the rotor body and the side wall of the housing, the rotor being connected to the cyclone turbine by a rotation axle, the rotation axle being inserted in a turbine bearing, the turbine bearing being formed in the cyclone turbine; and an outlet formed on the sidewall of the housing near the rotor body of the rotor for allowing liquids to flow out from the housing, wherein the inlet is positioned at a level below the outlet on the sidewall of the housing.

2. The cyclone turbine flowmeter as defined in claim 1, wherein the cyclone turbine includes a plurality of blades that form a plurality of flow channels, the flow channels being inclined at a predetermined angle.

3. The cyclone turbine flowmeter as defined in claim 1, wherein the cyclone turbine includes a rotation groove, formed at the center of the cyclone turbine, for receiving the rotation axle.

4. The cyclone turbine flowmeter as defined in claim 3, wherein the rotation axle has a diameter less than that of the rotation groove, such that the rotation axle rotates less than the rotor.

5. The cyclone turbine flowmeter as defined in claim 1, wherein the rotor includes a plurality of blades, having a plurality of flow path grooves inclined at a predetermined angle to form flow paths, so that the rotor may be smoothly rotated by a high pressure of fluids passing through the flow paths.

6. The cyclone turbine flowmeter as defined in claim 1, wherein the rotor further comprises one or move magnets formed in the body of the rotor.

7. The cyclone turbine flowmeter as defined in claim 1, wherein the rotor has a predetermined number of measurement grooves formed on its periphery, the measurement grooves operating to reflect light or to allow light to pass through.

8. The cyclone turbine flowmeter as defined in claim 7, wherein the rotor further comprises a photo device, formed in front of the measuring grooves, the photo device operating to transmit or receive light.

9. The cyclone turbine flowmeter as defined in claim 1, wherein the upper cap is formed with a visible window for seeing through the state of rotation of the rotor.

10. The cyclone turbine flowmeter as defined in claim 9, wherein the visible window is made of a transparent or semi-transparent material.

11. The cyclone turbine flowmeter as defined in claim 1, wherein the upper cap is formed with a sensor groove for fixedly inserting therein a hall sensor and its electric wires to detect the state of rotation of the rotor.

12. The cyclone turbine flowmeter as defined in claim 1, wherein the upper cap has an axle groove formed in its center for receiving the rotation axle.

13. The cyclone turbine flowmeter as defined in claim 1, wherein a groove is formed on the body of the rotor, and is reduced by the length of the rotor body in which magnets were mounted.

14. The cyclone turbine flowmeter as defined in claim 1, wherein the housing includes upper and lower packing grooves formed at an inner side of upper and lower parts of the housing, respectively, the upper and lower packing grooves operating to respectively receive upper and lower packing members.

\* \* \* \* \*